United States Patent
Zhu et al.

(10) Patent No.: US 9,071,291 B2
(45) Date of Patent: Jun. 30, 2015

(54) METHOD AND APPARATUS FOR MIMO-BASED MULTIPLE BASE STATION COLLABORATIVE COMMUNICATION

(75) Inventors: Xiaolong Zhu, Shanghai (CN); Dong Li, Shanghai (CN); Yang Song, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 466 days.

(21) Appl. No.: 13/125,304

(22) PCT Filed: Oct. 31, 2008

(86) PCT No.: PCT/CN2008/001826
§ 371 (c)(1),
(2), (4) Date: Apr. 20, 2011

(87) PCT Pub. No.: WO2010/048745
PCT Pub. Date: May 6, 2010

(65) Prior Publication Data
US 2011/0207494 A1      Aug. 25, 2011

(51) Int. Cl.
*H04W 36/00* (2009.01)
*H04B 7/02* (2006.01)
(Continued)

(52) U.S. Cl.
CPC ........... *H04B 7/024* (2013.01); *H04W 72/1278* (2013.01); *H04L 5/0014* (2013.01); *H04L 5/0094* (2013.01); *H04L 5/0035* (2013.01)

(58) Field of Classification Search
CPC .. H04W 52/244; H04W 52/243; H04W 72/12
USPC .................................. 455/443, 444, 450, 451
See application file for complete search history.

(56) References Cited

U.S. PATENT DOCUMENTS

2006/0120477 A1   6/2006   Shen et al.
2006/0268769 A1   11/2006  Pan et al.
(Continued)

FOREIGN PATENT DOCUMENTS

CN      1870461 A     11/2006
CN    101095296 A     12/2007
(Continued)

OTHER PUBLICATIONS

English Bibliography for Japanese Patent App. Publication No. JP2007116686A, published May 10, 2007, printed from Thomson Innovation on Sep. 12, 2013, 4 pp.
(Continued)

*Primary Examiner* — Tu X Nguyen
(74) *Attorney, Agent, or Firm* — Fay Sharpe LLP

(57) ABSTRACT

A solution for multiple base station collaborative communication in TDD (Time Division Duplex) and FDD (Frequency Division Duplex) systems is provided. To be specific, a serving base station and coordinating base station transmit detection signals with specific Multiple Input Multiple Output (MIMO) features on one or more communication resources. The mobile station measures the detection signals on the one or more communication resources and generates indication information of the recommended collaborative communication modes based on the measurement results. Preferably the indexes of the time-frequency resources corresponding to the recommended collaborative communication modes are reported to the serving base station. Then the serving base station schedules at least one of the one or more mobile stations according to the indication information reported by the one or more stations and provides MIMO communication manner for the mobile station scheduled. The coverage of the cells is improved, the cell edge user throughput is increased and the inter-cell interference between neighboring base stations is decreased by exploiting the invention. Preferably the amount of uplink feedback information is decreased and the uplink bandwidth is saved.

20 Claims, 5 Drawing Sheets

(51) Int. Cl.
*H04W 72/12* (2009.01)
*H04L 5/00* (2006.01)

(56) References Cited

U.S. PATENT DOCUMENTS

| | | |
|---|---|---|
| 2007/0093273 A1 | 4/2007 | Cai |
| 2007/0147536 A1 | 6/2007 | Melzer et al. |
| 2008/0075058 A1 | 3/2008 | Mundarath et al. |
| 2008/0080423 A1* | 4/2008 | Kolding et al. ............... 370/329 |
| 2008/0101498 A1 | 5/2008 | Han et al. |
| 2010/0056170 A1* | 3/2010 | Lindoff et al. ............. 455/452.1 |
| 2010/0067450 A1* | 3/2010 | Balachandran et al. ...... 370/329 |

FOREIGN PATENT DOCUMENTS

| | | | |
|---|---|---|---|
| JP | 2007116686 A | | 5/2007 |
| WO | 2007102546 A1 | | 9/2007 |
| WO | WO2008/124535 A2 | | 10/2008 |

OTHER PUBLICATIONS

English Bibliography for PCT Patent App. Publication No. WO2007102546A1, published Sep. 13, 2007, printed from Thomson Innovation on Sep. 12, 2013, 3 pp.
EP Patent Application No. 08877648.9, European Search Report, Aug. 6, 2013, 8 pp.
Uchida et al; "A Study on Multi-Site Cooperative MIMO Communication System", Information Technology R&D Center, Mitsubishi Electric Corporation, The general conference of The Institute of Electronics, Information and Communication Engineers (IEICE), Communication 1, Mar. 5, 2008, Japan, 1 pp. (with English translation of Section 3 from prosecution of counterpart JP Application No. 2001-533507, 1 pp.).
IEEE C802.16m-07/244, IEEE 802.16 Broadband Wireless Access Working Group, Collaborative MIMO, pp. 1-9, Nov. 7, 2007.
International Search Report for PCT/CN2008/001826 dated Aug. 13, 2009.
R1-083569, Further discussion on Inter-Cell Interference Mitigation through Limited Coordination, 3GPP TSP RAN WG1 Meeting #54bis, Sep. 29-Oct. 3, 2008, Prague, Czech Republic, 10 pp.

* cited by examiner

METHOD AND APPARATUS FOR MIMO-BASED MULTIPLE BASE STATION COLLABORATIVE COMMUNICATION

FIELD OF THE INVENTION

The present invention relates to wireless communication network, more particularly, to method and apparatus for MEMO-based multiple base station collaborative communication.

BACKGROUND OF THE INVENTION

In order to improve the performance of single-user MIMO (Multiple Input Multiple Output) and multi-user MIMO, Alcatel-Lucent Company etc. have invented multi-BS (base station) collaborative manner. Its basic idea is the joint MIMO transmission and receiving among multiple BSs and one or more mobile stations (MS) on the same wireless resources. This technology has basic features in two aspects:

1) Multiple BSs can serve one or more MSs on the same time-frequency resources via the coordination among the BSs.

2) Each BS can serve one or more MSs on the same time-frequency resources.

In the multi-BS collaborative MIMO manner, each BS needs to set up the best collaborative relationship and design the optimal MIMO transmission scheme according to the channel information of all the served MSs. Obtaining downlink channel information can be realized in different manners:

i. For TDD (Time-Division Duplex) system, the BS can obtain the uplink channel fading response through uplink sounding signal or uplink traffic channels because of the reciprocity between the uplink channel and the downlink channel of TDD system. The uplink channel estimation can be used for approximating the channel state information of the downlink as long as the time interval between the uplink and downlink transmission is smaller than the coherence time.

ii. For FDD (Frequency-Division Duplex) system, the downlink channel fading response is almost uncorrelated with the uplink one, since the frequency interval between the uplink channel and the downlink channel generally exceeds the channel coherent bandwidth. So it is impossible to estimate the channel state information of the downlink based on the uplink channel response.

Therefore in FDD system, the channel state information can be obtained through the manner in which each MS feeds back the downlink channel coefficients to BS; or the downlink channel information can be obtained through the manner in which each MS calculates multiple codebooks and chooses the best one therefrom, then feeds back the index and SINR (signal-to-interference and noise ratio) of the channel to BS.

The drawback of the described manner i is that it is only applicable to TDD system and not applicable to FDD system;

And the drawback of the described manner ii is that the amount of the feedback of the terminals is huge and will occupy the limited uplink channel resources in the manner in which the downlink channel coefficients are feedback; and in the manner in which the codebooks are calculated, the computation complexity of the terminals is higher.

SUMMARY OF THE INVENTION

To solve the existing problem described above in the prior art, the present disclosure provides a solution suitable for the multi-BS collaborative communication in both TDD and FDD systems. More particularly, the serving BS (BS that the MS registered with when the MS is turned on and has access to the network, or the target BS newly connected by the MS when it carries out handover between cells.) and the coordinating BS (the BS which coordinates with the serving BS to serve the MSs) send specific beam signals used for detection on one or more communication resources, also the detection signals with specific MIMO features. The MS measures the detection signals on the one or more communication resources and generates the indication information of the recommended collaborative communication modes based on the measurement results. Preferably the indexes of the time-frequency resources corresponding to the recommended collaborative communication modes are reported to the serving base station. Then the serving base station schedules at least one of the one or more MSs according to the indication information reported by one or more MSs and provides MIMO communication manner for the at least one scheduled MS.

According to the first aspect of the present invention, there is provided a method of providing communication manner for one or more mobile stations served by a serving base station in a serving base station in a MIMO-based wireless communication network, comprising following steps: sending one or more first detection signals with respective MIMO features to the one or more mobile stations respectively on one or more communication resources; obtaining indication information from the one or more mobile stations, the indication information being used to indicate the information related to the communication resources and/or MIMO features corresponding to the recommended collaborative communication modes recommended by the one or more mobile stations; scheduling at least one mobile station of the one or more mobile stations according to the indication information and providing MIMO communication manner for the at least one scheduled mobile stations.

According to the second aspect of the present invention, there is provided a method of assisting a serving base station to provide communication manner for the mobile station served coordinately by the coordinating base station in a coordinating base station in a MIMO-based wireless communication network, comprising following step: sending one or more second detection signals with MIMO features to the one or more mobile stations on one or more communication resources.

According to the third aspect of the present invention, there is provided a method of assisting serving base station to provide communication manner for a mobile station in the mobile station in a MIMO-hased wireless communication network, comprising following steps: obtaining at least one detection signals with MIMO features sent on one or more communication resources from one or more base stations, wherein, the one or more base stations include the serving base station; measuring the signal strength of at least one of the detection signals with MIMO features sent by one or more base stations on at least one of the one or more communication resources; generating one or more indication information according to the measured signal strength, the one or more indication information being used to indicate the information related to the communication resources and/or MIMO features corresponding to one or more recommended collaborative communication modes recommended by the mobile station.

According to the fourth aspect of the present invention, there is provided a first providing apparatus for providing communication manner for one or more mobile stations served by a serving base station in a serving base station in a MIMO-based wireless communication network, comprising: a first signal sending means, for sending one or more first detection signals with respective MIMO features to the one or more mobile stations respectively on one or more communication resources; an indication information obtaining means, for obtaining indication information from the one or more mobile stations, the indication information being used to indicate the information related to the communication resources and/or MIMO features corresponding to a recommended collaborative communication modes recommended by the one or more mobile stations; a second providing means, for scheduling at least one mobile station of the one or more mobile stations according to the indication information and providing MIMO communication manner for the at least one scheduled mobile stations.

According to the fifth aspect of the present invention, there is provided a first assisting apparatus for assisting a serving base station to provide communication manner for the mobile station served coordinately by the coordinating base station in a coordinating base station in a MIMO-based wireless communication network, comprising: a second signal sending means, for sending one or more second detection signals with MIMO features to the one or more mobile stations on one or more communication resources.

According to the sixth aspect of the present invention, there is provided a second assisting apparatus for assisting serving base station to provide communication manner for a mobile station in the mobile station in a MIMO-based wireless communication network, comprising: a signal obtaining means, for obtaining at least one detection signals with MEMO features sent on one or more communication resources from one or more base stations, wherein, the one or more base stations include the serving base station; a measuring means, for measuring the signal strength of at least one of the detection signals with MIMO features sent by one or more base stations on at least one of the one or more communication resources; an indication information generating means, for generating one or more indication information according to the measured signal strength, the one or more indication information being used to indicate the information related to the communication resources and/or MIMO features corresponding to one or more recommended collaborative communication modes recommended by the mobile station.

The advantages of the present invention include:
i) Feasible to both FDD and TDD system;
ii) Preferably in the indication information sent by the MS, the MS only needs to feed back the index of time-frequency resource corresponding to the suitable multi-BS collaborative communication or the communication manner in which at least one coordinating BS of the multiple BSs suppresses interference to the MS. The MS does not need to feedback the channel coefficients respectively between it and the serving BS and the channel coefficients between it and the coordinating BSs. Therefore the amount of uplink feedback information is decreased and the uplink bandwidth is saved.
iii) Extended cell coverage and improved throughput for cell edge users;
iv) Reduced inter-cell interference (ICI) to neighboring BSs.

BRIEF DESCRIPTION OF DRAWINGS

With reference to the following detailed description of the non-restrictive embodiments, other features, objects and advantages of the present invention will be more apparent.

Wherein, same or similar reference numerals refer to same or similar apparatuses (modules) or steps.

DETAILED DESCRIPTION OF EMBODIMENTS

Figure 1:
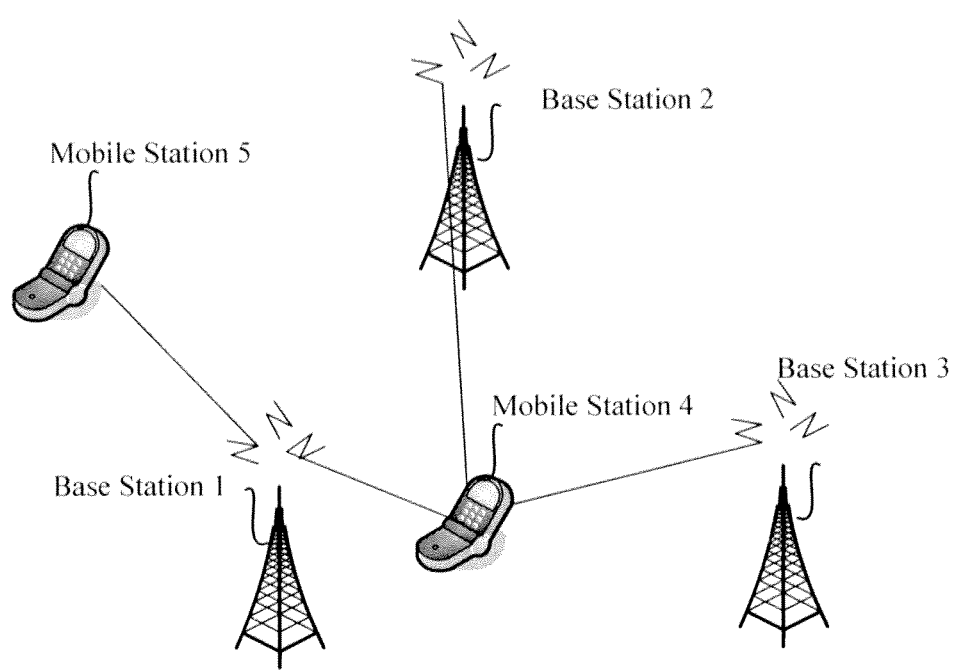
FIG. 1 shows a schematic diagram of multi-BS collaborative MIMO in a wireless communication network according to an embodiment of the present invention.

FIG. 1 shows a schematic diagram of multi-BS collaborative MIMO in a wireless communication network according to an embodiment of the present invention. In FIG. 1, MS 4 is cooperatively served by BS 1, BS 2 and BS 3. Because MS 4 registers with BS 1, for example, MS 4 registers with BS 1 when it is turned on and had accessed to the network, or the target BS that MS 4 is newly accessed to is BS 1 when the MS carries out handover between cells. Therefore, BS 1 is the serving BS for MS 4. When MS 4 is located at the position adjacent to the cell edge of BS 2 and BS 3, serving BS 1 interacts control instruction with BS 2 and BS 3. BS 1 indicates BS 2 and BS 3 to cooperate with BS 1 and complete the communication with MS 4. Thus, BS 2 and BS 3 are the coordinating BSs of MS 4. Meanwhile, BS 1 also serves MS 5. BS 1 serves MS 4 and MS 5 by applying MU-MIMO (Multi-User Multiple Input Multiple Output) manner to avoid or minimize the multi-user interference between MS 4 and MS 5. BS 2 and BS 3 serve MS 4 by applying SU-MIMO (Single-User Multiple Input Multiple Output).

Figure 2:
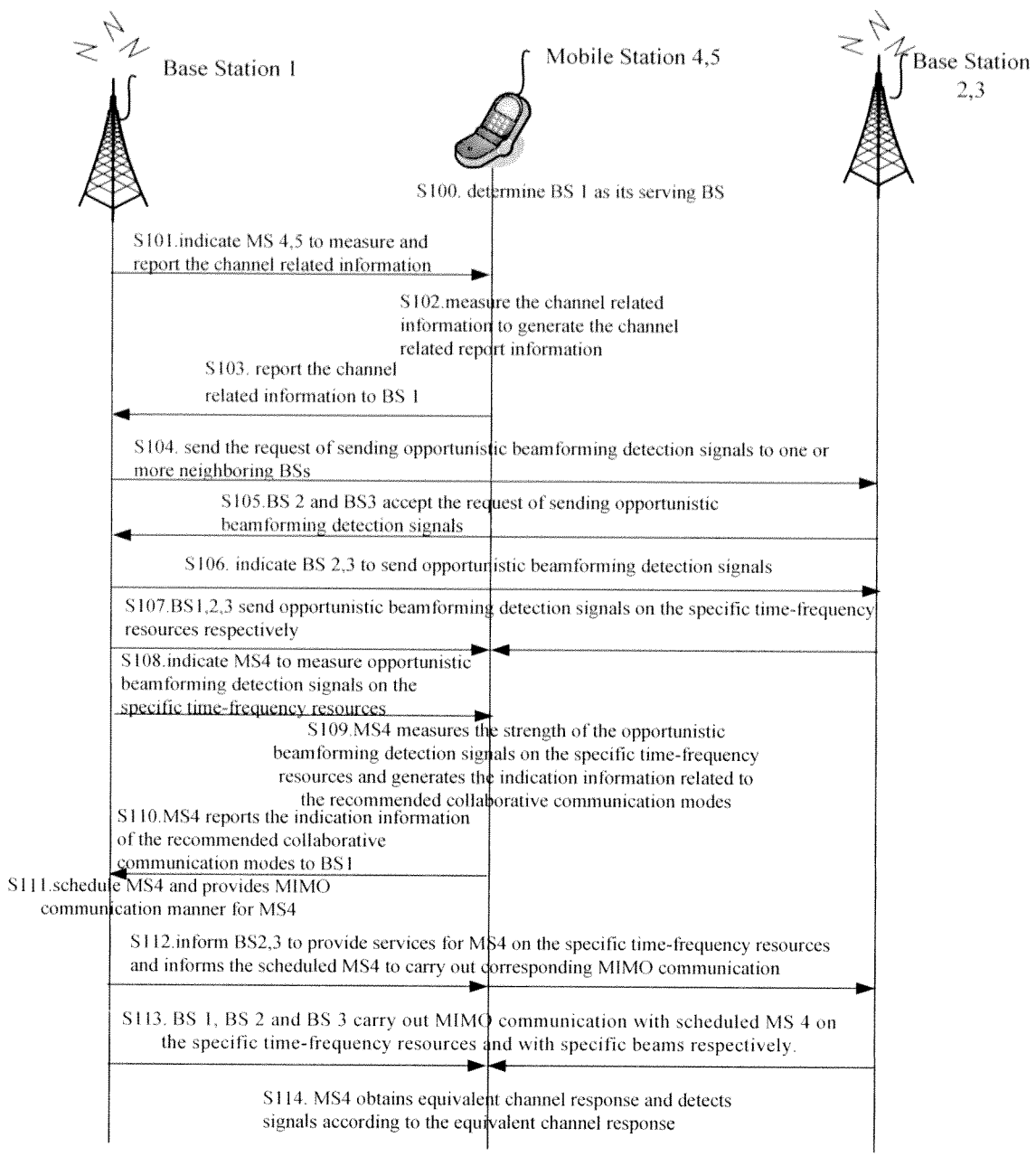
FIG. 2 shows a flowchart of the systematic method according to an embodiment of the present invention.

Referring to FIG. 2 and with reference to FIG. 1, a flowchart of the systematic method of the present invention is described in detail. FIG. 2 shows a flowchart of the systematic method according to an embodiment of the present invention. The case of the communication among BS 1, BS 2, BS 3 and MS 4, MS 5 is taken as an example to describe an embodiment of the present invention, as follows.

First, in the step S100, MS 4 determines BS 1 as its serving BS. When it is turned on and has access to the network, MS 4 registers related information with BS 1, therefore, BS 1 is the serving BS of MS 4; or, in another case, when MS carries out handover between cells, MS 4 moves from its home cell to the neighboring cell and sets up communication with the target BS 1 in the neighboring cell. Thus, BS 1 is the serving BS of MS 4. Likewise, MS 5 also determines BS 1 as its serving BS. It could be understood that only two MSs, which are served by BS 1, MS 4 and MS 5 are shown for the convenience of the illustration, while in practical network configuration, a BS can serve one or more MSs. Certainly, the present invention is also applicable to BS 1 which serves multiple MSs.

Then, in the step S101, BS 1 indicates MS 4 and MS 5 that are served by BS 1 to measure and report the channel related information respectively. More particularly, BS 1 allocates uplink control channel for MS 4 and MS 5 and sets the conditions of reporting channel related report information so that MS 4 and MS 5 can report measurement results of their channel related information in this control channel.

In the step S102, MSs 4, 5 measure the channel related information respectively to generate the channel related report information. More particularly, the channel related report information may includes channel quality related information, for example, RSSI (Received Signal Strength Indicator), CINR (Carrier Interference to Noise Ratio), or CQI (Channel Quality Indicator), or further includes the location related information of the MSs, for example, DoA (Direction of Arrival) or AoA (Angle of Arrival) of the MS.

Wherein it is easier to estimate RSSI and the computation is not so complicated, as it does not need to process and demodulate the received sampled signals. However, the received signals meanwhile also include noise, interference and other channel loss, therefore that the received signals is strong does not mean that the channel and the signal quality are good, but only means that there are strong signals in the channel.

CINR (or SNR or SINR) provides the information that how strong the desired signals is compared to the interference (or noise or interference plus noise). Most wireless communication systems are interference limited system, so CIR and CINR are more usually applied. Compared to RSSI, these measurement results provide more accurate and reliable estimation, but the expense is more complicated calculation and extra delay. By estimating signal power and interference power respectively and then obtaining the ratio of the two values, CINR may be estimated. This channel parameter may be used to calculate signal power.

It is commonly known to those skilled in the art, how MSs realize the measurement of RSSI, CINR, CQI and DoA. Thus, the present invention will not describe them here.

MSs 4, may measure the channel related information between them and the serving BS, i.e., BS 1, and may measure the channel related information between them and other BSs, for example, BSs 2, 3, as well to generate the channel related report information.

Then, in the step S103, MSs 4, 5 provide respective channel related report information for BS 1 or channel related report information that satisfies the channel related report information conditions set by BS 1 for BS 1 respectively.

In a varied embodiment, MSs 4, 5 have already obtained the instruction information from BS 1 in advance. That is to say, MSs 4, 5 have known the control channel and the condition in which the channel related report information should be reported to BS 1. Therefore, step S100 to step S102 may be omitted, for example, MSs 4, 5 report their channel related report information to BS 1 periodically.

Then, in the step S104, BS 1 sends, the request of sending detection signals with specific MIMO features, to one or more neighboring BSs, according to the report results of the channel related report information of one or more MSs served by BS 1. In the present embodiment, these detection signals with specific MIMO features are considered as opportunistic beamforming detection signals to serve as an example to illustrate the present invention.

More particularly, in the step 104, according to the obtained channel related report information of multiple MSs, including the channel related report information obtained respectively from MS 4 and MS 5 in the step S103, BS 1 determines if it is necessary to serve a certain MS with the multi-BS collaborative MIMO manner and with which BSs the collaborative MIMO manner will be established. Once the multi-BS collaborative MIMO manner is selected, serving BS 1 needs to send, the request of sending opportunistic beamforming detection signals, to the specific neighboring BSs. In the present embodiment, serving BS 1 determines that MS 4 is served in the manner in which collaborative MIMO is set up with BS 2 and BS 3 and MS 5 is served in non-collaborative MEMO manner meanwhile. In the present embodiment, serving BS 1 selects serving MS 4 and MS 5 simultaneously on the same time-frequency resources. Thus, the conventional Single-BS Multi-User MEMO manner has been formed among BS 1 and MS 4, MS 5. The operation principle of multi-BS collaborative MIMO of the present invention will be described as follows with MS 4 as an example. MS 5 will not be described.

Then, in the step S105, each described requested BS determines whether to accept the request of sending opportunistic beamforming detection signals together with BS 1 initiated by BS 1, according to the information of its resource occupation status, etc. In the present embodiment, BS 2 and BS 3 send determining information to BS 1 to determine sending opportunistic beamforming detection signals cooperatively with BS 1.

When BS 1 obtains the request of accepting sending beamforming detection signals from one or more neighboring BSs, for example, BS 2 and BS 3, in the step S106, BS 1 indicates coordinating BS 2 and BS 3 to send opportunistic beamforming detection signals.

Preferably, in the step S106, BS 1 may further indicate coordinating BSs 2, 3 which specific beams should be sent on the specific time-frequency resources to point to or not point to the specific MSs or to send random beams. Therefore, coordinating BSs 2, 3 obtain the indication information that in which direction beams should be sent on which time-frequency resources from BS 1. For example, BS 1 indicates BSs 2 and 3 respectively to send opportunistic beamforming detection signals 2B and 3A on the No. 1 time-frequency block and indicates BSs 2, 3 respectively to send opportunistic beamforming detection signals 2A and 3C on the No. 2 time-frequency block to hope to point to or not point to MS 4.

Then, in the step 107, serving BS 1 and coordinating BSs 2, 3 send opportunistic beamforming detection signals on the specific time-frequency block at the same time.

Figure 3:
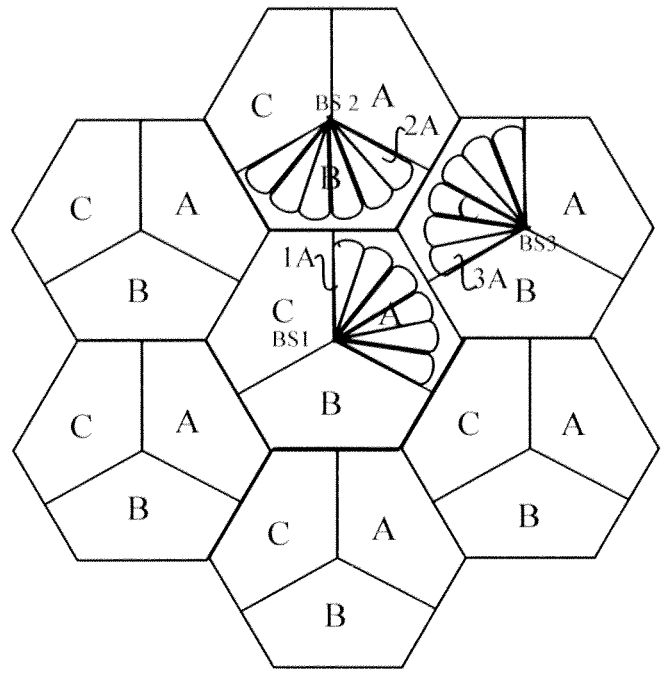
FIG. 3 shows an example in which multiple BSs send multiple opportunistic beamforming detection signals coordinately.

The sending process of the beam signals by BSs 1, 2 and 3 will be described in detail as follows. FIG. 3 describes an example in which multiple BSs send multiple opportunistic beamforming detection signals coordinately. The basic idea of the so-called opportunistic beamforming is that the throughput of the system may be maximized by allocating the channels preferably to the users who can complete the continuous transmission most possibly. For the reflection spatial channels, opportunistic beamforming manner may point to the users with the highest SINR; on the other hand, in the case of sufficient scattering, the opportunistic mechanism will allocate the channels to the user with the highest instantaneous capacity.

In the present embodiment, each cell is divided to three sectors as shown in FIG. 3. Each sector is 120 degrees. Wherein, BS 1 is located in the center of the cell and it corresponds to the sector with 120 degrees in the cell. BS 1 may send beams of six kinds of directions. Six beams are marked as 1A-1F respectively clockwise. Considering the limitation of the space, not all the reference numbers of the beams are shown in the figure. It could be understood that a sector may also correspond to eight beams or other several beams and it maybe configured by the BS serving this sector. Accordingly, exemplary, BS 2 also sends beams of six kinds of directions, arranged clockwise, marked as 2A-2F in the sector served by BS 2. BS 3 also sends beams of six kinds of directions, arranged clockwise, marked as 3A-3F in the sector served by BS 3.

In the present embodiment, all the sectors are divided to three subsets, subset A, subset B and subset C respectively. Each subset includes several non-neighboring sectors. The sectors served by BS 1 are located in subset A; the sectors served by BS 2 are located in subset B; the sectors served by BS 3 are located in subset C. BSs belonging to different subsets may send beam detection signals on the different sub-carriers of the same time-frequency blocks. As the beams from different subsets are all sent with different sub-carriers, thus, according to the sub-carriers used by the received beams, MSs may decide from which BS the beams come and distinguish them from the beams from other BSs.

Serving BS 1 may determine to send the specific beams on the specific time-frequency resources according to the channel related report information of the MSs. For example, when the channel related report information reported by MS 4 includes DoA or AoA between MS 4 and BS 1, BS 1 may point the beam detection signals to the target MS 4 according to DoA or AoA information between MS 4 and BS 1 reported by MS 4. For example, BS 1 sends opportunistic beamforming detection signals IC on the No. 1 time-frequency resource block, sends opportunistic beamforming detection signals IC on the No. 2 time-frequency resource block to hope to point to target MS 4. Moreover, BS 1 also sends opportunistic beamforming detection signals on the No. 3-No. 10 time-frequency resources. The present specification sets No. 1-No. 10 time-frequency resources as an example for illustration, it could be understood, that in the practical application scenarios, the index of the time-frequency resources may be changed. It is not limited to the ten time-frequency resource blocks described above and may include multiple time-frequency resource blocks.

If in the step S106, the detection instruction information sent form BS 1 to BS 2 and BS 3 includes indicating coordinating BS 2 to send opportunistic beamforming detection signals 2B on the No. 1 time-frequency resource block, to send opportunistic beamforming detection signals 2A on the No. 2 time-frequency resource block; and indicating BS 3 to send opportunistic beamforming detection signals 3A on the No. 1 time-frequency resource block, to send opportunistic beamforming detection signals 3C on the No. 2 time-frequency resource block, in the step S107, BS 1 sends opportunistic beamforming detection signals 1C on the No. 1 time-frequency resource block, and sends opportunistic beamforming detection signals IC on the No. 2 time-frequency resource block; according to the detection instruction information from BS 1, BS 2 sends opportunistic beamforming detection signals 2B on the No. 1 time-frequency resource block, and sends opportunistic beamforming detection signals 2A on the No. 2 time-frequency resource block; correspondingly, in the step S107, according to the detection instruction information from BS 1, BS 3 sends opportunistic beamforming detection signals 3A on the No. 1 time-frequency resource block, and sends opportunistic beamforming detection signals 3C on the No. 2 time-frequency resource block.

In the step S107, BS 2 and BS 3 may also send opportunistic beamforming detection signals on the No. 3-No. 10 time-frequency resource blocks.

Then, in the step S108, BS 1 further indicates MS 4 to measure the opportunistic beamforming detection signals from each BS on all or part of the No. 1-No. 10 time-frequency resource blocks.

Alternatively, in the step S108, BS 1 further indicates MS 4 the manner and the condition to report the indication information of the recommended collaborative communication modes generated according to the measurement of the beamforming detection signals to BS 1.

Then, in the step S109, according to the indication of BS 1, MS 4 measures the strength of the opportunistic beamforming detection signals on the indicated time-frequency blocks respectively. Referring to FIG. 4, step S109 and step S110 will be described in detail as follows.

Figure 4A:
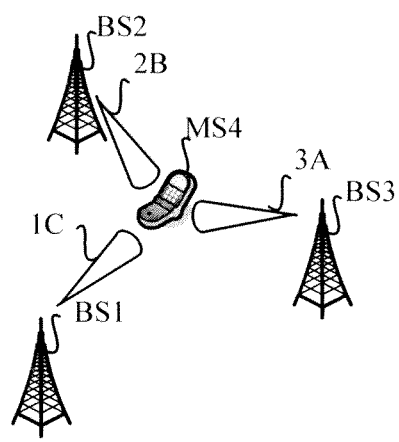
FIG. 4A shows a schematic diagram in which MS 4 detects opportunistic beamforming signals from multiple BSs on the No. 1 time-frequency block.
Figure 4B:
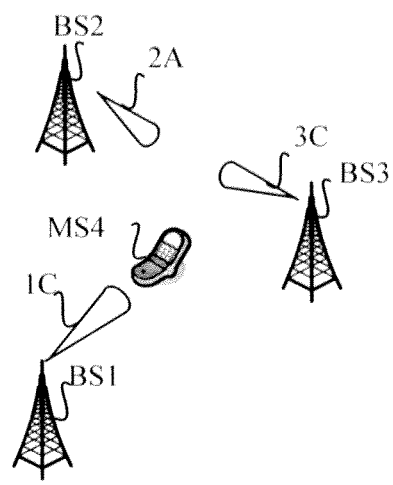
FIG. 4B shows a schematic diagram in which MS 4 detects opportunistic beamforming signals from multiple BSs on the No. 2 time-frequency block.

FIG. 4A shows a schematic diagram in which MS 4 detects opportunistic beamforming signals from multiple BSs on the No. 1 time-frequency block. FIG. 4B shows a schematic diagram in which MS 4 detects opportunistic beamforming signals from multiple BSs on the No. 2 time-frequency block.

As shown in FIG. 4A, on the No. 1 time-frequency block, MS 4 may detect beam signals from three BSs. As different BSs use different sub-carriers to send beam signals, therefore, MS 4 may distinguish which BS that its received signals come from respectively.

In the present embodiment, MS 4 measures the opportunistic beamforming detection signals from serving BS 1, coordinating BSs 2 and 3 respectively. For example, when the signal strength from serving BS 1 detected by MS 4 is above a first predefined threshold, for example −85 dBm, for example, the signal strength from serving BS 1 detected by MS is −80 dBm, and the signal strength from at least one coordinating BS is above a second predefined threshold, for example, −90 dBm, for example, the signal strengths from coordinating BSs 2 and 3 detected by MS 4 are −84 dBm and −85 dBm respectively, both above a second predefined threshold, according to the indication of BS 1, MS 4 may take this collaborative communication mode, also the manner in which BS 1 BS 2 and BS 3 provide date services for the MSs with the respective beams in this case or the No. 1 time-frequency resource block corresponding to these beams, as the collaborative communication modes recommended by the MSs, to the serving BS (for the convenience of illustration, hereinafter referred to as first recommended collaborative communication mode).

When the signal strengths from serving BS 1 detected by MS 4 on multiple time-frequency resources are above a first predefined threshold, and at least one signal strength from the coordinating BSs is above a second predefined threshold, according to the indication of BS 1, MS 4 may take all the multiple collaborative communication modes that satisfy the conditions above as the recommended collaborative communication mode to report to serving BS 1. Besides, according to the indication of BS 1, MS 4 may also select the mode with the highest gain thereof as the recommended collaborative communication mode.

In the step S110, according to the report instruction information of BS 1, MS 4 reports the indication information indicating one or more first recommended collaborative communication modes to BS 1.

In another case, on the No. 2 time-frequency resource, as shown in FIG. 4B, when the signal strength from BS 1 detected by MS 4 is above a third threshold, for example −60 dBm, for example, the signal strength from BS 1 detected by MS is −55 dBm, and the signal strengths from coordinating BSs 2, 3 are both below a fourth predefined threshold, for example, −100 dBm, for example, the signal strengths from coordinating BSs 2 and 3 detected by MS 4 are −105 dBm and −120 dBm respectively, both below −100 dBm, according to the indication of BS 1, MS 4 may take this collaborative communication mode, also, the manner in which BS 1 provides data services for MS 4 with this beam or the No. 2 time-frequency resource corresponding to this beam, and at least one coordinating base station suppresses the interference to the MS, as the recommended collaborative communication mode for BS 1, hereinafter referred to as second recommended collaborative communication mode. In another word, second recommended collaborative communication mode indicates that only BS 1 provides data services for MS 4 with this beam or the time-frequency resource corresponding to the beam and at least one coordinating base station, preferably, BS 2 that has greatest interference to MS 4 on the communication resource (its signal strength is greatest, −105 dBm), to coordinate with BS 1 in the manner of suppressing the interference to the MS, that is to say, beam direction sent by BS 2 should avoid the direction of MS 4. In the real system, in the case of interference suppression, the efficiency of the manner in which all the coordinating BSs suppress the interference to the MS is not high. Therefore, in general, in the case of tolerance of the system error rate, it only needs to guarantee that the signal of the BS that interferes the MS most avoids the direction of the MS.

In the step S110, according to the indication of BS 1, MS 4 may also report the related instruction information of the second recommended collaborative communication mode to BS 1.

Certainly, when the signal strengths from serving BS 1 on multiple time-frequency resources detected by MS 4 are above a third predefined threshold, and the signal strength from each respective coordinating BS is below a fourth predefined threshold, according to the indication of BS 1, the MS may take all the multiple collaborative communication modes that satisfy the conditions above as the recommended collaborative communication mode to report to serving BS 1. Preferably, MS 4 selects thereof the mode with the greatest signal strength from serving BS 1, as the recommended collaborative communication mode, for example, the second recommended collaborative communication mode, and in the step S110, report the related indication information of the second recommended collaborative communication mode to BS 1 to save the uplink feedback bandwidth.

Certainly, MS 4 may report the first recommended collaborative communication mode and the second recommended collaborative communication mode to BS 1 simultaneously according to the indication of BS 1, or may also further select the mode with the greater gain from the two modes to report to BS 1. For example, if the system capacity obtained by applying first recommended collaborative communication mode is higher than the system capacity obtained by applying second recommended collaborative communication mode, MS 4 only reports the indication information corresponding to the first recommended collaborative communication mode, vice versa, MS 4 only reports the indication information corresponding to the second recommended collaborative communication mode.

It should be noted that, the values for the first predefined threshold, the second predefined threshold, the third predefined threshold and the fourth predefined threshold described above are only illustrative. Those skilled in the art may select other thresholds according to the real situation.

Certainly, if a MS only finds that on only one time-frequency resource block, the detected detection signal strength from the serving BS is above a third threshold, and all the detected detection signal strength from the coordinating BSs is below a fourth threshold, that is, corresponding to the communication manner in which only serving BS 1 provides data services for the MS and at least one of other coordinating BSs, for example, BS 3, suppresses the interference to the MS, after traversing every time-frequency resource blocks in a frame, for example, from the No. 1 time-frequency resource to the No. 10 time-frequency resource, the MS takes this communication manner as the recommended collaborative communication mode and reports the corresponding index of the time-frequency block to BS 1, for example, the No. 3 time-frequency block.

Therefore, in the step S110, according to the report instruction information of BS 1, MS 4 reports, the communication resources and/or MIMO features corresponding to the recommended collaborative communication mode recommended by it, to serving BS 1.

For example, according to the indication of BS 1, MS 4 reports the manner corresponding to that BS 1, BS 2 and BS 3 provide data services for the MS on the No. 1 time-frequency resource block at the same time and/or the beams as shown in FIG. 4A corresponding to the manner, which is recommended by MS 4, as shown in FIG. 4A, and may also report the manner corresponding to that BS 1 provides data services for the MS on the No. 2 time-frequency resource block, and BS 2 coordinates with BS 1 in the manner in which it suppresses the interferences to MS 4 on the No. 2 time-frequency resource block and/or the beams as shown in FIG. 4B corresponding to the manner, as shown in FIG. 4B. More particularly, according to the indication of BS 1, MS 4 reports to BS 1 that the index of the time-frequency block suitable for that multiple BSs provide data services for MS 4 at the same time is 1, and the index of the time-frequency block suitable for that only the serving BS provides data services for MS 4 and at least one coordinating BS suppresses the interferences to MS 4 is 2.

Alternatively, in the step S110, according to the indication of BS 1, MS 4 may select the mode with the greater gain from the two collaborative communication modes to report to BS 1. For example, when the system capacity corresponding to the collaborative mode in which the serving BS and coordinating BSs provide date services at the same time on the No. 1 time-frequency resource block is higher than the system capacity corresponding to the collaborative mode in which only the serving station provides data services and at least one coordinating base station suppresses the interference to MS 4 on the No. 2 time-frequency resource block, MS 4 only reports first recommended collaborative communicate mode and its corresponding No. 1 time-frequency resource block to BS 1; vice versa, MS 4 only reports second recommended collaborative communicate mode and its corresponding No. 2 time-frequency resource block to BS 1.

Alternatively, in the step S110, MS 4 may also report each detected signal strength or the capacity corresponding to the recommended collaborative communication mode which it recommends to BS 1. For example, MS 4 reports to BS 1 that the detected signal strength from serving BS 1 is −80 dBm and the detected signal strengths from coordinating BSs 2 and 3 are −84 dBm and −85 dBm respectively on the No. 1 time-frequency resource block; the detected signal strength from serving BS 1 is −55 dBm and the detected signal strengths from coordinating BSs 2 and 3 are −105 dBm and −120 dBm respectively on the No. 2 time-frequency resource block.

Then, in the step S111, according to the indication information of the recommended collaborative communication mode obtained from the MSs served by serving BS 1, serving BS 1 schedules at least one of the MSs comprehensively and provides the communication manner corresponding to the recommended collaborative communication mode recommended by the MS for the scheduled MS. More particularly, for example, BS 1 obtains the indication information from MS 4 to indicate the two recommended communication modes recommended by MS 4, that is to say, on the No. 1 time-frequency resource block, the communication manner in which BS 1, BS 2 and BS 3 provide data services for MS 4 coordinately, and on the No. 2 time-frequency resource, the coordinating communication manner in which only BS 1 provides data services for MS 4 and BS 2 suppresses the interferences to MS 4.

Alternatively, if a certain coordinating BS, for example BS 2, has a service with higher priority to process, or the degrees of freedom of BS 2 is limited, so that BS 2 is not allowed to be synchronized with BS 1, or for other reasons, BS 1 may determine a communication manner that is different from the recommended collaborative mode recommended by the MS, for example, selecting that serving BS 1 provides services for MS 4 without coordinating with other BSs; or scheduling that BS 1 and BS 3 provide data services for MS 4 on the No. 1 time-frequency resource coordinately, and BS 2 coordinates with BS 1 and BS 3 in the manner in which it suppresses the interferences to MS 4 on the No. 1 time-frequency resource; or BS 1 schedules for MS 4 that only BS 1 provides data services for MS 4 on the No. 2 time-frequency resource block, and BS 3 coordinates with BS 1 in the manner in which it suppresses the interferences to MS 4 on the No. 2 time-frequency resource block.

Certainly, if the indication information from MS 4 received by BS 1 only includes one recommended collaborative communication mode, BS 1 also needs to comprehensively consider the indication information fed back by each MS served by BS 1 and the related occupation situation of the coordinating BSs for scheduling. The detailed scheduling manner of BS 1 is similar to the scheduling manner of BS 1 when the indication information reported by MS 4 to BS 1 includes various recommended collaborative communication modes described above, and will not be described here.

Then, in the step S112, BS 1 informs BSs 2, 3 to provide data communication services for MS 4 on the specific time-frequency resources and with specific beams according the result of scheduling, and informs the scheduled MS 4 to carry out corresponding MIMO communication on the specific time-frequency resources.

For example, BS 1 informs BS 2 to carry out data service transmission in the direction that avoids MS 4 on the No. 1 time-frequency resource, and informs BS 3 to send beamforming data according to the direction of the opportunistic beamforming detection signals sent before and weight related information; or informs BS 2 to carry out data service transmission in the direction that avoids MS 4 on the No. 2 time-frequency resource.

Moreover, BS 1 informs MS 4 to carry out corresponding MIMO communication on the specific time-frequency resources. More particularly, BS 1 informs MS 4 to use two antennas on the No. 1 time-frequency resource to receive the MIMO data signals from BS 1 and BS 2 at the same time, or to receive data signals from BS 1 on the No. 2 time-frequency resource.

Then, in the step S113, BS 1, BS 2 and BS 3 carry out MIMO communication with scheduled MS 4 on the specific time-frequency resources and with specific beams according to the indication in the step S112 respectively.

In the step S114, MS 4 obtains equivalent channel response and detects signals according to the equivalent channel response.

In a varied embodiment, each detection signal under beamforming process described above may also be replaced with the detection signal under precoding with a certain codeword in the codebook and it does not influence the essence of the present invention.

In a varied embodiment, steps S100-S103 may also be omitted. That is to say, serving BS 1 sends one or more different opportunistic beamforming detection signals randomly on one or more time-frequency resources without the need of the channel related information from the MSs.

In a varied embodiment, steps S104-S106 may also be omitted. Each coordinating BS may make an agreement with the serving BS on which communication resources and with what direction the opportunistic beamforming detection signals will be sent, in the initial period of the network configuration. Therefore, the step S107 may be replaced with the step S107', and in the step S107', the serving BS and the coordinating BSs send agreed beam detection signals on the specific communication resources periodically according to the agreement respectively.

In a varied embodiment, the step S108 may also be omitted. MS 4 and serving BSs have made an agreement in which frame(s) of which time slot(s) the MS should detect the opportunistic beamforming detection signals, during the period of the network configuration. Therefore the step S109 may be replaced with the step S109'. In the step S109', MS 4 detects the received opportunistic beamforming detection signals in the agreed one or more time slots of one or more frames in turn.

Moreover, the MS and the serving BS may make an agreement on the manner and the condition that the MS should report the indication information corresponding to the recommended collaborative communication mode to the serving BS, during the period of the network configuration. Therefore the step S110 may be replaced with the step S110', that is to say the MS may report the indication information corresponding to the recommended collaborative communication mode to the serving BS on the specific manner when the conditions are satisfied, without the need of obtaining the report instruction information from the serving BS in real time.

In a varied embodiment, the step S110 may also be omitted. That is to say, in some certain scenarios, the MS may make an agreement with the serving BS not to report the indication information. These scenarios include, but not limited to, when the signal detected by the MS from the serving BS is below a fifth predefined threshold, or the beam signals detected by the MS from the serving BS and the beam signals detected by the MS from the coordinating BSs are neither suitable for multi-BS collaboration nor suitable for the interference-suppressing communication manner, etc. Therefore, in this frame, there is no BS to provide service for the MS that has not reported the indication information. But BS will provide service for this user in the following frames.

In a varied embodiment, a BS may send different opportunistic beamforming detection signals through different antennas on a same time-frequency resource to obtain the spatial diversity or the gain.

Moreover, there is no strict order between the step S106 and the step S108. BS 1 may execute the step S106 and the step S108 simultaneously, or may also execute the step S106 at first and then execute the step S108, or execute the step S108 at first and then execute the step S106.

Figure 5:
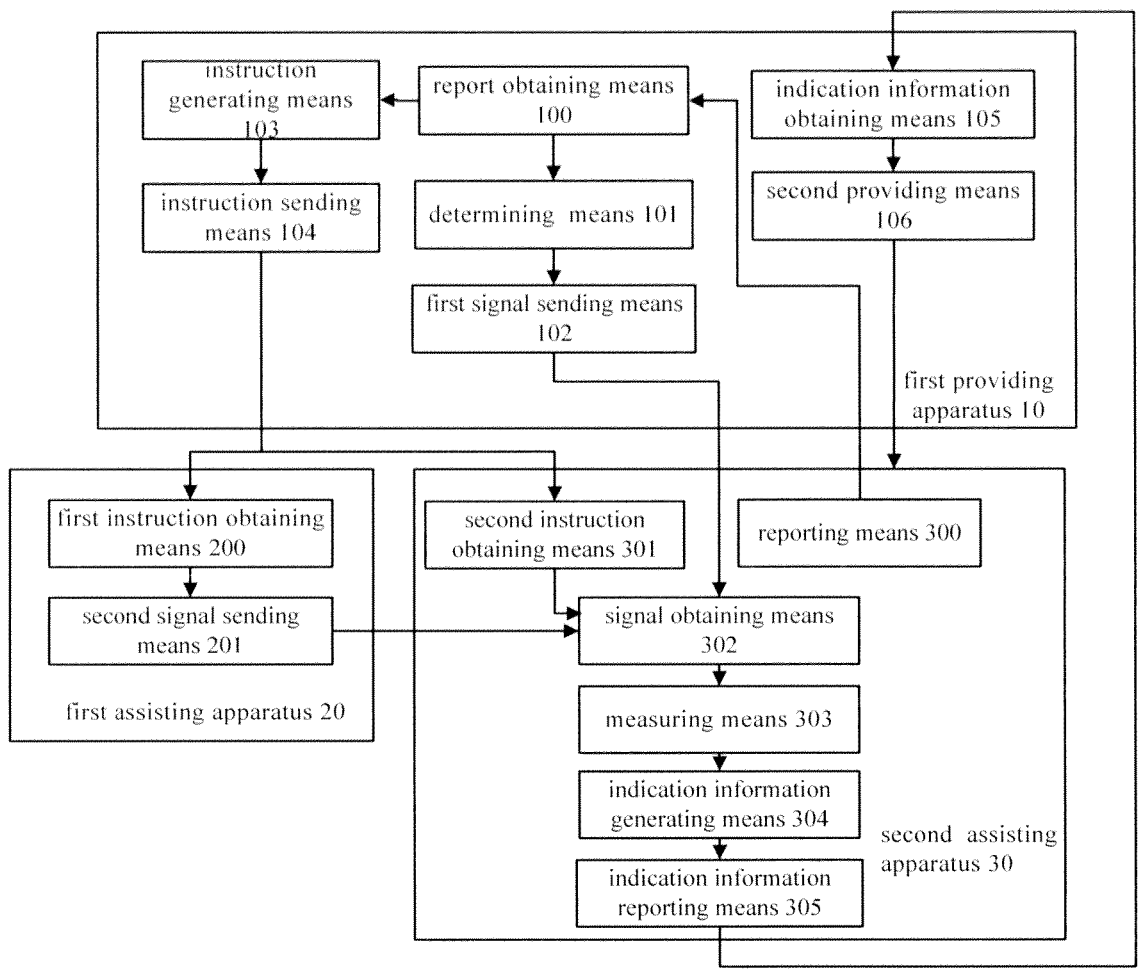
FIG. 5 shows the block diagram of a first providing apparatus 10 in serving BS 1, a first assisting apparatus 20 in coordinating BSs 2, 3 and a second assisting apparatus 30 in MS 4, for carrying out MIMO-based multi-BS collaborative communication, in a wireless communication network according to an embodiment of the present invention.

FIG. 5 shows the block diagram for a first providing apparatus 10 in serving BS 1, a first assisting apparatus 20 in coordinating BSs 2, 3 and a second assisting apparatus 30 in MS 4, for carrying out MIMO-based multi-BS collaborative communication, in a wireless communication network according to an embodiment of the present invention.

Wherein the first providing apparatus 10 is located in BS 1 shown in FIG. 1. The first providing apparatus 10 includes a report obtaining means 100, a determining means 101, a first signal sending means 102, an instruction generating means 103, an instruction sending means 104, an indication information obtaining means 105 and a second providing means 106.

Wherein the first assisting apparatus 20 includes a first instruction obtaining means 200 and a second signal sending means 201.

Wherein the second assisting apparatus 30 includes a second instruction obtaining means 301, a signal obtaining means 302, a measuring means 303, an indication information generating means 304 and an indication information reporting means 305.

Referring to FIG. 2 and with reference to FIG. 1, a block diagram of the systematic method of the present invention is described in detail. The case of the communication among BS 1, BS 2, BS 3 and MS 4, MS 5 is taken as an example to describe an embodiment of the present invention, as follows.

First, MS 4 determines BS 1 as its serving BS. When it is turned on and has access to the network, MS 4 registers related information with BS 1, therefore, BS 1 is the serving BS of MS 4; or, in another case, when MS carries out handover between cells, MS 4 moves from its home cell to the neighboring cell and sets up communication with the target BS 1 in the neighboring cell. Thus, BS 1 is the serving BS of MS 4. Likewise, MS 5 also determines BS 1 as its serving BS. It could be understood that only two MSs, which are served by BS 1, MS 4 and MS 5 are shown for the convenience of the illustration, while in practical network configuration, a BS can serve one or more MSs. Certainly, the present invention is also applicable to BS which serves multiple MSs.

Then, BS 1 indicates MS 4 and MS 5 that are served by BS 1 to measure and report the channel related information respectively. More particularly, BS 1 allocates uplink control channel for MS 4 and MS 5 and sets the conditions of reporting channel related report information so that MS 4 and MS 5 can report measurement results of their channel related information in this control channel.

Then, MSs 4, 5 measure the channel related information respectively to generate the channel related report information. More particularly, the channel related report information may includes channel quality related information, for example, RSSI (Received Signal Strength Indicator), CINR (Carrier Interference to Noise Ratio), or CQI (Channel Quality Indicator), or further includes the location related information of the MSs, for example, DoA (Direction of Arrival) or AoA (Angle of Arrival) of the MS.

Wherein it is easier to estimate RSSI and the computation is not so complicated, as it does not need to process and demodulate the received sampled signals. However, the received signals meanwhile also include noise, interference and other channel loss, therefore that the received signals is strong does not mean that the channel and the signal quality are good, but only means that there are strong signals in the channel.

CINR (or SNR or SINR) provides the information that how strong the desired signals is compared to the interference (or noise or interference plus noise). Most wireless communication systems are interference limited system, so CIR and CINR are more usually applied. Compared to RSSI, these measurement results provide more accurate and reliable estimation, but the expense is more complicated calculation and extra delay. By estimating signal power and interference power respectively and then obtaining the ratio of the two values, CINR may be estimated. This channel parameter may be used to calculate signal power.

It is commonly known to those skilled in the art, how MSs realize the measurement of RSSI, CINR, CQI and DoA. Thus, the present invention will not describe them here.

MSs 4, 5 may measure the channel related information between them and the serving BS, i.e., BS 1, and may measure the channel related information between them and other BSs, for example, BSs 2, 3, as well to generate the channel related report information.

After carrying out the operation described above, the reporting means 300 of MSs 4, 5 provide respective channel related report information for BS 1 or channel related report information that satisfies the channel related report information conditions set by BS 1 for BS 1 respectively.

In a varied embodiment, MSs 4, 5 have already obtained the instruction information from BS 1 in advance. That is to say, MSs 4, 5 have known the control channel and the condition in which the channel related report information should be reported to BS 1. Therefore, the reporting means 300 can report their channel related report information to BS 1 periodically without the need of depending on the previous operation of MSs 4, 5 and BS 1.

Then, a sending request means (not shown) in a first providing apparatus 10 sends, the request of sending detection signals with specific MIMO features, to one or more neighboring BSs, according to the report results of the channel related report information of one or more MSs served by BS 1. In the present embodiment, these detection signals with specific MIMO features are considered as opportunistic beamforming detection signals to serve as an example to illustrate the present invention.

More particularly, according to the obtained channel related report information of multiple MSs, including the channel related report information obtained respectively from MS 4 and MS 5 by a report obtaining means 100, BS 1 determines if it is necessary to serve a certain MS with the multi-BS collaborative MIMO manner and with which BSs the collaborative MIMO manner will be established. Once the multi-BS collaborative MIMO manner is selected, the sending request means needs to send, the request of sending opportunistic beamforming detection signals, to the specific neighboring BSs. In the present embodiment, serving BS 1 determines that MS 4 is served in the manner in which collaborative MIMO is set up with BS 2 and BS 3 and MS 5 is served in non-collaborative MIMO manner meanwhile. In the present embodiment, serving BS 1 selects serving MS 4 and MS 5 simultaneously on the same time-frequency resources. Thus, the conventional Single-BS Multi-User MIMO manner has been formed among BS 1 and MS 4, MS 5. The operation principle of multi-BS collaborative MIMO of the present invention will be described as follows with MS 4 as an example. MS 5 will not be described.

Then, a request determining means (not shown) in a first assisting apparatus 20 of each described requested BS determines whether to accept the request of sending opportunistic beamforming detection signals together with BS 1 initiated by BS 1, according to the information of its resource occupation status, etc. In the present embodiment, the request determining means in BS 2 and BS 3 send determining information to BS 1 to determine sending opportunistic beamforming detection signals cooperatively with BS 1.

When BS 1 obtains the request of accepting sending beamforming detection signals from one or more neighboring BSs, for example, BS 2 and BS 3, the instruction generating means 103 indicates coordinating BS 2 and BS 3 to send opportunistic beamforming detection signals.

Preferably, the instruction generating means 103 may further indicate coordinating BSs 2, 3 which specific beams should be sent on the specific time-frequency resources to point to or not point to the specific MSs or to send random beams. Therefore, coordinating BSs 2, 3 obtain the indication information that in which direction beams should be sent on which time-frequency resources from BS 1. For example, BS 1 indicates BSs 2 and 3 respectively to send opportunistic beamforming detection signals 2B and 3A on the No. 1 time-frequency block and indicates BSs 2, 3 respectively to send opportunistic beamforming detection signals 2A and 3C on the No. 2 time-frequency block to hope to point to or not point to MS 4.

Then, an instruction sending means 104 sends the instruction described above to BS 2 and BS 3.

The first signal sending means 102 of serving BS 1 and the second signal sending means 201 of coordinating BSs 2, 3 send opportunistic beamforming detection signals on the specific time-frequency block at the same time.

The sending process of the beam signals by BSs 1, 2 and 3 will be described in detail as follows. FIG. 3 describes an example in which multiple BSs send multiple opportunistic beamforming detection signals coordinately. The basic idea of the so-called opportunistic beamforming is that the throughput of the system may be maximized by allocating the channels preferably to the users who can complete the continuous transmission most possibly. For the reflection spatial channels, opportunistic beamforming manner may point to the users with the highest SINR; on the other hand, in the case of sufficient scattering, the opportunistic mechanism will allocate the channels to the user with the highest instantaneous capacity.

In the present embodiment, each cell is divided to three sectors as shown in FIG. 3. Each sector is 120 degrees. Wherein, BS 1 is located in the center of the cell and it corresponds to the sector with 120 degrees in the cell. BS 1 may send beams of six kinds of directions. Six beams are marked as 1A-1F respectively clockwise. Considering the limitation of the space, not all the reference numbers of the beams are shown in the figure. It could be understood that a sector may also correspond to eight beams or other several beams and it maybe configured by the BS serving this sector. Accordingly, exemplary, BS 2 also sends beams of six kinds of directions, arranged clockwise, marked as 2A-2F in the sector served by BS 2. BS 3 also sends beams of six kinds of directions, arranged clockwise, marked as 3A-3F in the sector served by BS 3.

In the present embodiment, all the sectors are divided to three subsets, subset A, subset B and subset C respectively. Each subset includes several non-neighboring sectors. The sectors served by BS 1 are located in subset A; the sectors served by BS 2 are located in subset B; the sectors served by BS 3 are located in subset C. BSs belonging to different subsets may send beam detection signals on the different sub-carriers of the same time-frequency blocks. As the beams from different subsets are all sent with different sub-carriers, thus, according to the sub-carriers used by the received beams, MSs may decide from which BS the beams come and distinguish them from the beams from other BSs.

More particularly, the determining means 101 of serving BS 1 may determine to send the specific beams on the specific time-frequency resources according to the channel related report information of the MSs. For example, when the channel related report information reported by MS 4 includes DoA or AoA between MS 4 and BS 1, the determining means 101 may point the beam detection signals to the target MS 4 according to DoA or AoA information between MS 4 and BS 1 reported by MS 4. For example, the determining means 101 determines to send opportunistic beamforming detection signals IC on the No. 1 time-frequency resource block, and send opportunistic beamforming detection signals IC on the No. 2 time-frequency resource block to hope to point to target MS 4. Moreover, BS 1 also sends opportunistic beamforming detection signals on the No. 3-No. 10 time-frequency resources. The present specification sets No. 1-No. 10 time-frequency resources as an example for illustration, it could be understood, that in the practical application scenarios, the index of the time-frequency resources may be changed. It is not limited to the ten time-frequency resource blocks described above and may include multiple time-frequency resource blocks.

If the detection instruction information sent from the instruction sending means 104 to BS 2 and BS 3 includes indicating coordinating BS 2 to send opportunistic beamforming detection signals 2B on the No. 1 time-frequency resource block, to send opportunistic beamforming detection signals 2A on the No. 2 time-frequency resource block; and indicating BS 3 to send opportunistic beamforming detection signals 3A on the No. 1 time-frequency resource block, to send opportunistic beamforming detection signals 3C on the No. 2 time-frequency resource block, the first signal sending means 102 sends opportunistic beamforming detection signals 1C on the No. 1 time-frequency resource block, and sends opportunistic beamforming detection signals 1C on the No. 2 time-frequency resource block; according to the detection instruction information from the instruction sending means 104, the second signal sending means 201 in BS 2 sends opportunistic beamforming detection signals 2B on the No. 1 time-frequency resource block, and sends opportunistic beamforming detection signals 2A on the No. 2 time-frequency resource block; correspondingly, according to the detection instruction information from the instruction sending means 104, the second signal sending means 201 in BS 3 sends opportunistic beamforming detection signals 3A on the No. 1 time-frequency resource block, and sends opportunistic beamforming detection signals 3C on the No. 2 time-frequency resource block.

Moreover, the second signal sending means of BS 2 and BS 3 may also send opportunistic beamforming detection signals on the No. 3-No. 10 time-frequency resource blocks.

Then, the instruction sending means 104 of BS 1 may further indicate MS 4 to measure the opportunistic beamforming detection signals from each BS on all or part of the No. 1-No. 10 time-frequency resource blocks.

Alternatively, the instruction sending means 104 further indicates MS 4 the manner and the condition to report the indication information of the recommended collaborative communication modes generated according to the measurement of the beamforming detection signals to BS 1. That is to say, the instruction sending means 104 sends the indication to a second instruction obtaining means 301.

Then, according to the indication from the instruction sending means 104 obtained by the second instruction obtaining means 301, the signal obtaining means 302 and the measuring means 303 of MS 4 measure the strength of the opportunistic beamforming detection signals on the indicated time-frequency blocks respectively. Referring to FIG. 4, the operation executed by the signal obtaining means 302 and the measuring means 303 will be described in detail as follows.

According to the indication obtained by the second instruction obtaining means 301, the measuring means 303 can detect opportunistic beamforming signals on the No. 1 and No. 2 time-frequency block or other time-frequency blocks.

FIG. 4A shows a schematic diagram in which MS 4 detects opportunistic beamforming signals from multiple BSs on the No. 1 time-frequency block. FIG. 4B shows a schematic diagram in which MS 4 detects opportunistic beamforming signals from multiple BSs on the No. 2 time-frequency block.

As shown in FIG. 4A, on the No. 1 time-frequency block, the measuring means 303 of MS 4 may detect beam signals from three BSs. As different BSs use different sub-carriers to send beam signals, therefore, the measuring means 303 may distinguish which BS that its received signals come from respectively.

In the present embodiment, the measuring means 303 measures the opportunistic beamforming detection signals from serving BS 1, coordinating BSs 2 and 3 respectively. For example, when the signal strength from serving BS 1 detected by the measuring means 303 is above a first predefined threshold, for example −85 dBm, for example, the signal strength from serving BS 1 detected by the measuring means 303 is −80 dBm, and the signal strength from at least one coordinating BS is above a second predefined threshold, for example, −90 dBm, for example, the signal strengths from coordinating BSs 2 and 3 detected by the measuring means 303 are −84 dBm and −85 dBm respectively, both above a second predefined threshold, according to the indication obtained by the second instruction obtaining means 301, the indication information generating means 304 may take this collaborative communication mode, also the manner in which BS 1 BS 2 and BS 3 provide date services for the MSs with the respective beams in this case or the No. 1 time-frequency resource block corresponding to these beams, as the collaborative communication modes recommended by the MSs, (for the convenience of illustration, hereinafter referred to as first recommended collaborative communication mode) to generate indication information. And the indication information reporting means 305 provides the indication information for serving BS 1.

When the signal strengths from serving BS 1 detected by the measuring means 303 on multiple time-frequency resources are above a first predefined threshold, and at least one signal strength from the coordinating BSs is above a second predefined threshold, according to the indication obtained by the second instruction obtaining means 301, the indication information generating means 304 may take all the multiple collaborative communication modes that satisfy the conditions above as the recommended collaborative communication mode and it will be reported to serving BS 1 by the indication information reporting means 305. Besides, according to the indication obtained by the second instruction obtaining means 301, the indication information generating means 304 may also select the mode with the highest gain thereof as the recommended collaborative communication mode, for example, first recommended collaborative communication mode. And the indication information reporting means 305 reports the indication information indicating one or more first recommended collaborative communication modes to BS 1.

In another case, on the No. 2 time-frequency resource, as shown in FIG. 4B, when the signal strength from BS 1 detected by the measuring means 303 is above a third threshold, for example −60 dBm, for example, the signal strength from BS 1 detected by the measuring means 303 is −55 dBm, and the signal strengths from coordinating BSs 2, 3 are both below a fourth predefined threshold, for example, −100 dBm, for example, the signal strengths from coordinating BSs 2 and 3 detected by the measuring means 303 are −105 dBm and −120 dBm respectively, both below −100 dBm, according to the indication obtained by the second instruction obtaining means 301, the indication information generating means 304 may take this collaborative communication mode, also, the manner in which BS 1 provides data services for MS 4 with this beam or the No. 2 time-frequency resource corresponding to this beam, and at least one coordinating base station suppresses the interference to the MS, as the recommended collaborative communication mode for BS 1, hereinafter referred to as second recommended collaborative communication mode. In another word, the second recommended collaborative communication mode indicates that only BS 1 provides data services for MS 4 with this beam or the time-frequency resource corresponding to the beam and at least one coordinating base station, preferably, BS 2 that has greatest interference to MS 4 on the communication resource (its signal strength is the greatest, −105 dBm) to coordinate with BS 1 in the manner of suppressing the interference to the MS, that is to say, beam direction sent by BS 2 should avoid the direction of MS 4. In the real system, in the case of interference suppression, the efficiency of the manner in which all the coordinating BSs suppress the interference to the MS is not high. Therefore, in general, in the case of tolerance of the system error rate, it only needs to guarantee that the signal of the BS that interferes the MS most avoids the direction of the MS.

According to the indication obtained by the second instruction obtaining means 301, the indication information reporting means 305 may also report the related instruction information of the second recommended collaborative communication mode to BS 1.

Certainly, when the signal strengths from serving BS 1 on multiple time-frequency resources detected by the measuring means 303 are above a third predefined threshold, and the signal strength from each respective coordinating BS is below a fourth predefined threshold, according to the indication obtained by the second instruction obtaining means 301, the indication information generating means 304 may take all the multiple collaborative communication modes that satisfy the conditions above as the recommended collaborative communication mode to report to serving BS 1. Preferably, the indication information generating means 304 selects thereof the mode with the greatest signal strength from serving BS 1, as the recommended collaborative communication mode, for example, the second recommended collaborative communication mode, and the indication information reporting means 305 reports the related indication information of the second recommended collaborative communication mode to BS 1 to save the uplink feedback bandwidth.

Certainly, the indication information reporting means 305 may report the first recommended collaborative communication mode and the second recommended collaborative communication mode to BS 1 simultaneously according to the indication obtained by the second instruction obtaining means 301, or may also further select the mode with the greater gain from the two modes to report to BS 1. For example, if the system capacity obtained by applying first recommended collaborative communication mode is higher than the system capacity obtained by applying second recommended collaborative communication mode, the indication information reporting means 305 only reports the indication information corresponding to the first recommended collaborative communication mode, vice versa, the indication information reporting means 305 only reports the indication information corresponding to the second recommended collaborative communication mode.

It should be noted that, the values for the first predefined threshold, the second predefined threshold, the third predefined threshold and the fourth predefined threshold described above are only illustrative. Those skilled in the art may select other thresholds according to the real situation.

Certainly, if the measuring means 303 of a MS only finds that on only one time-frequency resource block, the detected detection signal strength from the serving BS is above a third threshold, and all the detected detection signal strength from the coordinating BSs is below a fourth threshold, that is, corresponding to the communication manner in which only serving BS 1 provides data services for the MS and at least one of other coordinating BSs, for example, BS 3, suppresses the interference to the MS, after traversing every time-frequency resource blocks in a frame, for example, from the No. 1 time-frequency resource to the No. 10 time-frequency resource, the indication information generating means 304 of the MS takes this communication manner as the recommended collaborative communication mode and the indication information reporting means 305 reports the corresponding index of the time-frequency block to BS 1, for example, the No. 3 time-frequency block.

According to the report instruction information obtained by the second instruction obtaining means 301, the indication information reporting means 305 reports, the communication resources and/or MIMO features corresponding to the recommended collaborative communication mode recommended by it, to serving BS 1.

For example, according to the report instruction information obtained by the second instruction obtaining means 301, the indication information reporting means 305 reports the manner corresponding to that BS 1, BS 2 and BS 3 provide data services for the MS on the No. 1 time-frequency resource block at the same time and/or the beams as shown in FIG. 4A corresponding to the manner, which is recommended by MS 4, as shown in FIG. 4A, and may also report the manner corresponding to that BS 1 provides data services for the MS on the No. 2 time-frequency resource block, and BS 2 coordinates with BS 1 in the manner in which it suppresses the interferences to MS 4 on the No. 2 time-frequency resource block and/or the beams as shown in FIG. 4B corresponding to the manner, as shown in FIG. 4B. More particularly, according to the indication of BS 1, the indication information reporting means 305 reports to BS 1 that the index of the time-frequency block suitable for that multiple BSs provide data services for MS 4 at the same time is 1, and the index of the time-frequency block suitable for that only the serving BS provides data services for MS 4 and at least one coordinating BS suppresses the interferences to MS 4 is 2.

Alternatively, according to the indication of BS 1, the indication information reporting means 305 may select the mode with the greater gain from the two collaborative communication modes to report to BS 1. For example, when the system capacity corresponding to the collaborative mode in which the serving BS and coordinating BSs provide date services at the same time on the No. 1 time-frequency resource block is higher than the system capacity corresponding to the collaborative mode in which only the serving station provides data services and at least one coordinating base station suppresses the interference to MS 4 on the No. 2 time-frequency resource block, the indication information reporting means 305 only reports first recommended collaborative communicate mode and its corresponding No. 1 time-frequency resource block to BS 1; vice versa, the indication information reporting means 305 only reports second recommended collaborative communicate mode and its corresponding No. 2 time-frequency resource block to BS 1.

Alternatively, the indication information reporting means 305 may also report each detected signal strength or the capacity corresponding to the recommended collaborative communication mode which it recommends to BS 1. For example, MS 4 reports to BS 1 that the detected signal strength from serving BS 1 is −80 dBm and the detected signal strengths from coordinating BSs 2 and 3 are −84 dBm and −85 dBm respectively on the No. 1 time-frequency resource block; the detected signal strength from serving BS 1 is −55 dBm and the detected signal strengths from coordinating BSs 2 and 3 are −105 dBm and −120 dBm respectively on the No. 2 time-frequency resource block.

Then, according to the indication information of the recommended collaborative communication mode from the MSs served by serving BS 1 obtained by the indication information obtaining means 105, the second providing means 106 schedules at least one of the MSs comprehensively and provides the communication manner corresponding to the recommended collaborative communication mode recommended by the MS for the scheduled MS. More particularly, for example, the indication information obtaining means 105 obtains the indication information from MS 4 to indicate the two recommended communication modes recommended by MS 4, that is to say, on the No. 1 time-frequency resource block, the communication manner in which BS 1, BS 2 and BS 3 provide data services for MS 4 coordinately, and on the No. 2 time-frequency resource, the coordinating communication manner in which only BS 1 provides data services for MS 4 and BS 2 suppresses the interferences to MS 4.

Alternatively, if a certain coordinating BS, for example BS 2, has a service with higher priority to process, or the degrees of freedom of BS 2 is limited, so that BS 2 is not allowed to be synchronized with BS 1, or for other reasons, the second providing means 106 may determine a communication manner that is different from the recommended collaborative mode recommended by the MS, for example, selecting that serving BS 1 provides services for MS 4 without coordinating with other BSs; or scheduling that BS 1 and BS 3 provide data services for MS 4 on the No. 1 time-frequency resource coordinately, and BS 2 coordinates with BS 1 and BS 3 in the manner in which it suppresses the interferences to MS 4 on the No. 1 time-frequency resource; or BS 1 schedules for MS 4 that only BS 1 provides data services for MS 4 on the No. 2 time-frequency resource block, and BS 3 coordinates with BS 1 in the manner in which it suppresses the interferences to MS 4 on the No. 2 time-frequency resource block.

Certainly, if the indication information from MS 4 received by the indication information obtaining means 105 only includes one recommended collaborative communication mode, BS 1 also needs to comprehensively consider the indication information fed back by each MS served by BS 1 and the related occupation situation of the coordinating BSs for scheduling. The detailed scheduling manner of BS 1 is similar to the scheduling manner of BS 1 when the indication information reported by MS 4 to BS 1 includes various recommended collaborative communication modes described above, and will not be described here.

Then, BS 1 informs BSs 2, 3 to provide data communication services for MS 4 on the specific time-frequency resources and with specific beams according the result of scheduling, and informs the scheduled MS 4 to carry out corresponding MIMO communication on the specific time-frequency resources.

For example, BS 1 informs BS 2 to carry out data service transmission in the direction that avoids MS 4 on the No. 1 time-frequency resource, and informs BS 3 to send beamforming data according to the direction of the opportunistic beamforming detection signals sent before and weight related information; or informs BS 2 to carry out data service transmission in the direction that avoids MS 4 on the No. 2 time-frequency resource.

Moreover, BS 1 informs MS 4 to carry out corresponding MIMO communication on the specific time-frequency resources. More particularly, BS 1 informs MS 4 to use two antennas on the No. 1 time-frequency resource to receive the MIMO data signals from BS 1 and BS 2 at the same time, or to receive data signals from BS 1 on the No. 2 time-frequency resource.

Then, BS 1, BS 2 and BS 3 carry out MEMO communication with scheduled MS 4 on the specific time-frequency resources and with specific beams according to the scheduling result of the first providing apparatus 10.

Then, MS 4 obtains equivalent channel response and detects signals according to the equivalent channel response.

In a varied embodiment, each detection signal under beamforming processing described above may also be replaced with the detection signal under processing of precoding with a certain codeword in the codebook and it does not influence the essence of the present invention.

In a varied embodiment, the report obtaining means 100 and determining means 101 may also be omitted. That is to say, the first signal sending means 102 sends one or more different opportunistic beamforming detection signals randomly on one or more time-frequency resources without the need of the channel related report information from the MSs.

In a varied embodiment, the instruction generating means 103, the instruction sending means 104, the first instruction obtaining means 200, the second instruction obtaining means 301 may also be omitted. Each coordinating BS may make an agreement with the serving BS on which communication resources and with what direction the opportunistic beamforming detection signals will be sent, in the initial period of the network configuration. Therefore, the first signal sending means 102 and the second signal sending means 201 send agreed beam detection signals on the specific communication resources periodically according to the agreement respectively.

Moreover, MS 4 and serving BS have made an agreement in which frame(s) of which time slot(s) the MS should detect the opportunistic beamforming detection signals, during the period of the network configuration. Therefore the second instruction obtaining means 301 may be omitted. The signal obtaining means 302 detects the received opportunistic beamforming detection signals in the agreed one or more time slots of one or more frames in turn.

Moreover, the MS and the serving BS may make an agreement on the manner and the condition that the MS should report the indication information corresponding to the recommended collaborative communication mode to the serving BS, during the period of the network configuration. Therefore the indication information reporting means 305 may report the indication information corresponding to the recommended collaborative communication mode to the serving BS on the specific manner when the conditions are satisfied.

In a varied embodiment, the indication information reporting means 305 may also be omitted. That is to say, in some certain scenarios, the MS may make an agreement with the serving BS not to report the indication information. These scenarios include, but not limited to, when the signal detected by the MS from the serving BS is below a fifth predefined threshold, or the beam signals detected by the MS from the serving BS and the beam signals detected by the MS from the coordinating BSs are neither suitable for multi-BS collaboration nor suitable for the interference-suppressing communication manner, etc. Therefore, in this frame, there is no BS to provide service for the MS that has not reported the indication information. But BS will provide service for this user in the following frames.

In a varied embodiment, a BS may send different opportunistic beamforming detection signals through different antennas on a same time-frequency resource to obtain the spatial diversity or the gain.

The embodiments of the present invention have been described above. But the present invention is not limited to the specific systems, equipments or particular protocols. Those skilled in the art may make various variations or modifications in the scope of the claims attached.

The invention claimed is:

1. A method of serving a mobile station in a MIMO-based wireless communication network, comprising:
   sending respective detection signals with MIMO features from a serving base station and one or more coordinating base stations to a mobile station on respective communication resources such that the mobile station can identify the corresponding base station from which the respective detection signals were sent;
   obtaining indication information from the mobile station at the serving base station, the indication information related to at least one of the communication resources and the MIMO features associated with the respective detection signals, the indication information identifying a collaborative communication mode recommended by the mobile station, the collaborative communication mode indicating a combination of the serving base station and the one or more coordinating base stations recommended for MIMO communication service to the mobile station; and
   scheduling the mobile station for MIMO communication service via the recommended collaborative communication mode based at least in part on the indication information obtained from the mobile station.

2. The method according to claim 1, further comprising:
   sending respective detection instruction information from the serving base station to the one or more coordinating base stations, the respective detection instruction information instructing the corresponding coordinating base station to send the respective detection signals with the MIMO features to the mobile station on the respective communication resources.

3. The method according to claim 2, further comprising:
   obtaining channel related report information from the mobile station at the serving base station;
   determining the respective communication resources and the MIMO features associated with the respective detection signals based at least in part on the channel related report information, and
   generating the respective detection instruction information associated with the one or more coordinating base stations based at least in part on the channel related report information,
   wherein the detection instruction information associated with each coordinating base station includes the communication resources and the MIMO features associated with the detection signals associated with the corresponding coordinating base station.

4. The method according to claim 1, further comprising:
   obtaining channel related report information from the mobile station at the serving base station; and
   determining the respective communication resources and the MIMO features associated with the respective detection signals based at least in part on the channel related report information.

5. The method according to claim 1, further comprising:
   sending measure instruction information from the serving base station to the mobile station instructing the mobile station to measure the respective detection signals from the one or more coordinating base stations and the serving base station on at least a portion of the respective communication resources; and sending report instruction information from the serving base station to the mobile station indicating a manner and condition to report the indication information to the serving base station.

6. The method according to claim 1, wherein, if the recommended collaborative communication mode involves the serving base station and at least one coordinating base station providing data services to the mobile station at the same time, the method further comprising:

providing the MIMO communication service to the mobile station from the serving base station and the at least one coordinating base station via the recommended collaborative communication mode according to the indication information obtained from the mobile station.

7. The method according to claim 1, wherein the MIMO features include at least one of features used under beamforming processing and features used under codeword-weighting processing.

8. The method according to claim 1, wherein, if the recommended collaborative communication mode involves the serving base station providing data services for the corresponding mobile station and at least one coordinating base station suppressing interference to the corresponding mobile station, the method further comprising:

providing the MIMO communication service to the mobile station from the serving base station with interference suppression by the at least one coordinating base station via the recommended collaborative communication mode according to the indication information obtained from the mobile station.

9. The method according to claim 1, wherein the communication resources include at least one of a time resource, a frequency resource, and a coding scheme.

10. A method of serving a mobile station in a MIMO-based wireless communication network, comprising:

sending first detection signals with MIMO features from a serving base station to a mobile station on first communication resources;

sending second detection signals with MIMO features from a coordinating base station to the mobile station on second communication resources, wherein the first and second communication resources are such that the mobile station can identify the corresponding base station from which the first and second detection signals were sent;

obtaining indication information from the mobile station at the serving base station, the indication information related to at least one of the first and second communication resources and the MIMO features associated with the first and second detection signals, the indication information identifying a collaborative communication mode recommended by the mobile station, the collaborative communication mode indicating a combination of the serving base station and the coordinating base station recommended for MIMO communication service to the mobile station; and scheduling the mobile station for MIMO communication service via the recommended collaborative communication mode based at least in part on the indication information obtained from the mobile station.

11. The method according to claim 10, further comprising:
obtaining detection instruction information from the serving base station at the coordinating base station, the detection instruction information instructing the coordinating base station to send the second detection signals with the MIMO features to the mobile station on the second communication resources.

12. The method according to claim 11, wherein the detection instruction information from the serving base station includes the second communication resources and the MIMO features associated with the second detection signals.

13. The method according to claim 11, wherein the MIMO features include at least one of features used under beamforming processing and features used under codeword-weighting processing.

14. The method according to claim 10, wherein the first and second communication resources include at least one of a first and second time resource, a first and second frequency resource, and a first and second coding scheme.

15. The method according to claim 10, wherein, if the recommended collaborative communication mode from the mobile station involves the serving base station and the coordinating base station providing data services for the corresponding mobile station at the same time, the method further comprising:

providing the MIMO communication service to the mobile station from the serving base station and the coordinating base station via the recommended collaborative communication mode according to the indication information obtained from the mobile station.

16. The method according to claim 10, wherein, if the recommended collaborative communication mode involves the serving base station providing data services to the mobile station and the coordinating base station suppressing interference to the mobile station, the method further comprising:

providing the MIMO communication service to the mobile station from the serving base station with interference suppression by the coordinating base station via the recommended collaborative communication mode according to the indication information obtained from the mobile station.

17. A method of serving a mobile station in a MIMO-based wireless communication network, comprising:

sending first detection signals with MIMO features from a serving base station to a mobile station on first communication resources;

sending respective detection instruction information from the serving base station to one or more coordinating base stations, the respective detection instruction information instructing the corresponding coordinating base station to send second detection signals with MIMO features to the mobile station on respective second communication resources;

obtaining indication information from the mobile station at the serving base station, the indication information related to at least one of the corresponding first and second communication resources and the MIMO features associated with the respective first and second detection signals, the indication information identifying a collaborative communication mode recommended by the mobile station, the collaborative communication mode indicating a combination of the serving base station and the one or more coordinating base stations recommended for MIMO communication service to the mobile station; and scheduling the mobile station for MIMO communication service via the recommended collaborative communication mode based at least in part on the indication information obtained from the mobile station.

18. The method according to claim 17, further comprising:
- obtaining channel related report information from the mobile station at the serving base station; and
- determining the respective first and second communication resources and the MIMO features associated with the first and second detection signals based at least in part on the channel related report information.

19. The method according to claim 17, further comprising:
- obtaining channel related report information from the mobile station at the serving base station;
- determining the respective first and second communication resources and the MIMO features associated with the respective first and second detection signals based at least in part on the channel related report information, and
- generating the respective detection instruction information associated with the one or more coordinating base stations based at least in part on the channel related report information.

20. The method according to claim 17, further comprising:
- sending measure instruction information from the serving base station to the mobile station instructing the mobile station to measure the respective second detection signals from the one or more coordinating base stations and the first detection signals from the serving base station on at least a portion of the respective first and second communication resources; and
- sending report instruction information from the serving base station to the mobile station indicating a manner and condition to report the indication information to the serving base station.

* * * * *